(12) United States Patent
Datz et al.

(10) Patent No.: US 9,365,020 B2
(45) Date of Patent: Jun. 14, 2016

(54) METHOD FOR THE DRY PRODUCTION OF A MEMBRANE ELECTRODE UNIT, MEMBRANE ELECTRODE UNIT, AND ROLLER ARRANGEMENT

(75) Inventors: Armin Datz, Poxdorf (DE); Klaus Dennerlein, Erlangen (DE); Carola Kuehn, Nuremberg (DE); Andreas Reiner, Baiersdorf (DE); Werner Straub, Hessdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 91 days.

(21) Appl. No.: 14/345,350

(22) PCT Filed: Aug. 16, 2012

(86) PCT No.: PCT/EP2012/065987
§ 371 (c)(1),
(2), (4) Date: Mar. 17, 2014

(87) PCT Pub. No.: WO2013/037591
PCT Pub. Date: Mar. 21, 2013

(65) Prior Publication Data
US 2014/0374248 A1  Dec. 25, 2014

(30) Foreign Application Priority Data

Sep. 15, 2011  (EP) .................................... 11181457

(51) Int. Cl.
*B29C 65/02* (2006.01)
*B32B 37/06* (2006.01)
(Continued)

(52) U.S. Cl.
CPC ............. *B32B 37/0053* (2013.01); *B32B 37/16* (2013.01); *B32B 38/004* (2013.01);
(Continued)

(58) Field of Classification Search
CPC .......... B32B 7/06; B32B 15/08; B32B 27/00; B32B 37/0053; B32B 2037/0092; B32B 37/16; B32B 37/26; B32B 38/0036; B32B 38/004; B32B 38/10; B32B 38/164; B32B 2305/026; B32B 2307/20; B32B 2309/02; B32B 2309/12; B32B 2309/14; B32B 2379/08; B32B 2457/00; C25B 9/08; H01M 4/8814; H01M 4/8896; H01M 8/1004; Y02E 60/521; B29C 65/02; B29C 65/18; B29C 66/004; B29C 66/1122; B29C 66/43; B29C 66/80; B29C 66/90; B29C 66/919
USPC ................ 156/247, 289, 308.2, 308.4, 309.6
See application file for complete search history.

(56) References Cited

U.S. PATENT DOCUMENTS 5,761,793 A   6/1998  Bevers et al.
6,136,412 A  10/2000  Spiewak et al.
(Continued)

FOREIGN PATENT DOCUMENTS

DE   19509749 A1  10/1996
DE   10124272 A1  11/2002
(Continued)

OTHER PUBLICATIONS

James Larminie et al., "Fuel Cell Systems Explained", Second Edition, Wiley, 2003, pp. 72-73, ISBN 0-471-49026-1.

*Primary Examiner* — Sing P Chan
(74) *Attorney, Agent, or Firm* — Laurence Greenberg; Werner Stemer; Ralph Locher

(57) ABSTRACT

A method for the dry production of a membrane-electrode unit includes assembling a layered configuration including a centrally positioned membrane produced by extrusion and pre-dried at a temperature between 80° C. and 100° C. for 15 min to 30 min, a substrate-electrode unit on each side of the membrane having an electrode layer applied to a substrate, an optional frame around each substrate-electrode unit for fixing the substrate-electrode unit, and two separating films on outer sides. The configuration is pressed together between two laminating rollers so that a pressure connection is produced at least between the membrane and the electrode layers. A short production time is achieved because it is not necessary to keep the membrane moist at high temperatures under pressure. A membrane electrode unit and a roller configuration are also provided.

9 Claims, 1 Drawing Sheet

(51) Int. Cl.

| | | |
|---|---|---|
| *B32B 37/26* | (2006.01) | |
| *B32B 38/10* | (2006.01) | |
| *B32B 38/16* | (2006.01) | |
| *B32B 37/00* | (2006.01) | |
| *H01M 8/10* | (2016.01) | |
| *H01M 4/88* | (2006.01) | |
| *B32B 37/16* | (2006.01) | |
| *B32B 38/00* | (2006.01) | |
| *C25B 9/08* | (2006.01) | |

(52) U.S. Cl.
CPC .............. *B32B 38/10* (2013.01); *B32B 38/164* (2013.01); *C25B 9/08* (2013.01); *H01M 4/8814* (2013.01); *H01M 4/8896* (2013.01); *H01M 8/1004* (2013.01); *B32B 2037/0092* (2013.01); *B32B 2305/026* (2013.01); *B32B 2307/20* (2013.01); *B32B 2309/12* (2013.01); *B32B 2309/14* (2013.01); *B32B 2379/08* (2013.01); *B32B 2457/00* (2013.01); *Y02E 60/521* (2013.01); *Y02P 70/56* (2015.11)

(56) References Cited

U.S. PATENT DOCUMENTS

| | | | |
|---|---|---|---|
| 6,291,091 | B1 | 9/2001 | Preischl et al. |
| 6,627,035 | B2 | 9/2003 | Fan et al. |
| 6,692,858 | B2 * | 2/2004 | Higuchi ................. C08J 5/2218 29/623.3 |
| 7,226,689 | B2 | 6/2007 | Ye et al. |
| 7,658,867 | B2 | 2/2010 | Kanaoka et al. |
| 7,754,369 | B2 | 7/2010 | Starz et al. |
| 8,394,551 | B2 | 3/2013 | Zuber et al. |
| 2002/0192548 | A1 * | 12/2002 | Schaefer ................... B30B 5/06 429/209 |
| 2003/0159980 | A1 * | 8/2003 | Barss ................. B01D 67/0006 210/321.8 |
| 2003/0191021 | A1 | 10/2003 | Ripley et al. |
| 2005/0072514 | A1 | 4/2005 | Yan et al. |
| 2008/0020253 | A1 | 1/2008 | Neubert et al. |
| 2008/0057380 | A1 | 3/2008 | Dabel et al. |
| 2009/0169950 | A1 | 7/2009 | Prugh et al. |
| 2010/0291462 | A1 | 11/2010 | Thate et al. |
| 2011/0217621 | A1 | 9/2011 | Felix et al. |

FOREIGN PATENT DOCUMENTS

| | | |
|---|---|---|
| DE | 102005038612 A1 | 2/2007 |
| EP | 1176652 A2 | 1/2002 |
| EP | 1489677 A2 | 12/2004 |
| WO | 9934466 A1 | 7/1999 |
| WO | 0026982 A2 | 5/2000 |
| WO | 02059989 A2 | 8/2002 |
| WO | 02080296 A2 | 10/2002 |
| WO | 03073543 A2 | 9/2003 |
| WO | 2005006480 A2 | 1/2005 |
| WO | 2006005658 A2 | 1/2006 |
| WO | 2010075492 A1 | 7/2010 |

* cited by examiner

METHOD FOR THE DRY PRODUCTION OF A MEMBRANE ELECTRODE UNIT, MEMBRANE ELECTRODE UNIT, AND ROLLER ARRANGEMENT

BACKGROUND OF THE INVENTION

Field of the Invention

The invention relates to a method for the dry production of a membrane electrode unit, a membrane electrode unit produced in accordance with this method and a roller arrangement comprising two laminating rollers for the dry production of membrane electrode units.

As a rule, the production of membrane electrode units (otherwise membrane electrode assembly, MEA) takes place in accordance with the tried and tested method of fuel cell MEA production. In this method, the MEA components (electrode—moistened membrane—electrode) are positioned in an aluminum mold between silicone mats while a hot press is heated up. The two-piece aluminum mold is then held together in the preheated hot press by means of pressure and sealed by this means to avoid the membrane drying out during the process operation. Depending on the thickness of the press mold, the actual press time excluding the heating and cooling process is approx. 20 min to 40 min. The press mold must finally be cooled again before the removal of the MEA.

Another production method for membranes coated with catalysts on each side is known from DE 10 2005 038 612 A1. In this method a first and a second ionomer layer are applied in parallel to a first and a second substrate. Then an anode catalyst layer is applied to the first ionomer layer as a solution and a cathode catalyst layer is applied to the second ionomer layer as a solution and dried using hot air drying, infrared drying, microwave drying and/or plasma procedures. The substrates are removed after drying of the anode catalyst layer and the cathode catalyst layer, and the first ionomer layer is connected to the second ionomer layer with the aid of two laminating rollers under the influence of pressure and temperature. Finally the membrane, coated with a catalyst on each side, generated in the process is provided with a support film. However, the method in accordance with DE 10 2005 038 612 A1 is time-consuming, as the anode and cathode catalyst layer must be dried before the removal of the substrates before lamination.

In DE 101 24 272 A1 a method for the continuous production of a polymer electrolyte membrane electrode arrangement is described in which the electrolyte membrane is manufactured by means of the coating of a polymer substrate material with a solution containing PEM and then the solution containing PEM is dried. This electrolyte layer is then pressed in a double belt press with a carbonaceous substrate coated in parallel, which is likewise first dried.

However, the membranes produced from the solution can only be produced in layers of limited thickness, for a membrane thickness of 50 µm e.g. several hours of drying are required in order to obtain membranes with as few bubbles and cracks as possible.

BRIEF SUMMARY OF THE INVENTION

The object of the invention is to reduce the production time for the manufacture of membrane electrode units.

The object is achieved according to the invention by a method for the dry production of a membrane electrode unit for an electrolysis process, a layered arrangement being assembled, comprising: a membrane which is produced by means of extrusion, and which is pre-dried at a temperature between 80° C. and 100° C. for a period of time from 15 min to 30 min,
  a substrate electrode unit on each side of the membrane, comprising an electrode layer applied to a substrate,
  optionally a frame around each substrate electrode unit for fixing the substrate electrode unit; and
  two separating films on the outer sides,
wherein the arrangement is pressed together between two laminating rollers such that a pressure connection is produced at least between the membrane and the electrode layers.

The invention is based on the idea of keeping the substrate electrode units and the membrane dry throughout the entire production process and laminating them in a dry condition. Lamination takes place between the separating layers or films which protect the MEA from direct contact with the rollers or conveyor belts of a laminating machine.

Inside the separating films are the substrate electrode units comprising a substrate, e.g. of carbon paper, and an electrode layer applied to the substrates, for example of iridium on the anode side and platinum on the cathode side. The electrode layers are applied to the substrate, e.g. using a screen printing method, such that the finished electrode layers are dry.

Optionally frames are provided around the substrate electrode units, which in particular are made of Teflon®, polyether ketones (PEK, PEEK and PEKK), aramids or similarly temperature-stable plastics. Their function is to fix and seal the substrate electrode units; furthermore the pressure on the edge of the MEA is reduced by the frames. However, the frames are not mandatory and can be omitted.

Finally, the membrane is arranged between the electrode layers and is composed of a proton exchange membrane (PEM), in particular of Nafion®. However, other materials can also be used for the membrane. A prefabricated, commercial membrane produced by means of extrusion is used in this connection. Compared with the membrane known from DE 101 24 272 A1, the extruded membrane is considerably more stable on account of its morphology and can also be produced in layer thicknesses of 170 µm and greater. The mechanical stability of such a membrane is a major advantage for high-pressure electrolysis, above all, on account of possible high pressure differences between the hydrogen side and the oxygen side. In addition, the use of an extruded membrane is characterized by considerably lower investment costs compared with the method in accordance with DE 101 24 272 A1.

Before the membrane is used, it is pre-dried for approx. 15 min to 30 min at a temperature of approx. 80° C. to 100° C. The duration and the temperature of the drying process are based on the physical properties of the membrane, e.g. its thickness. The drying period of 15 min to 30 min relates to a membrane with a thickness of 180 µm. Based on the condition on delivery (RT and 50% R.H.), an extruded electrolyte membrane e.g. Nafion® 117 (180 µm in thickness) loses up to 5.5% water at 80° C.

Tests have shown that this temperature is sufficient in order to obtain a constant dry weight. At higher temperatures the membrane becomes wavy and then cannot be processed as well any longer.

Pre-drying prevents water from evaporating from the membrane while the membrane is being heated between the laminating rollers, which—above all in the case of large membrane areas—may then lead to puckering as a result of swelling of the membrane (in front of the roller feed). When the membrane is being heated via the laminating rollers, the membrane is not intensely heated completely for a long time, but only locally. At a preferred lamination speed of e.g. 20 cm/min, the pressure contact with the hot rollers lasts less than one second. The dry production of the membrane electrode units is therefore also more protective of the material than the method customary to date using a hot press.

This entire arrangement forms a unit which is pressed together between two laminating rollers of a roller arrangement. A pressure connection occurs between the membrane and the electrode layers as a result of the high pressure and possibly temperature, by means of which the inseparable membrane electrode unit is formed.

Such a membrane electrode unit is used for electrolysis in particular. However, this kind of production can also be used for the membrane electrode units of fuel cells and redox flow batteries.

The production of several membrane electrode units takes place thereby in particular continuously, with several sandwiched or layered arrangements being arranged consecutively between two quasi-endless separating films and the separating films being rolled along their length in a continuous process.

The proposed lamination method significantly reduces the time required to produce membrane electrode units. In addition, the method results in a reduction of the production costs, as less energy is needed for production compared with the production method currently practiced: a heating phase of the press need not be undertaken individually for each electrode and the cooling process is virtually eliminated. As lamination takes place when the membrane is dry, keeping the membrane moist at high temperatures under pressure in the hot press, as happened previously, is also unnecessary. The electrodes are not kept moist either. In addition, membrane electrode units which are produced and stored in a dry condition are more suitable for installation in stacks, as no distortion takes place as a result of swelling membranes. For a membrane electrode unit with an electrode area of approx. 300 cm$^2$ dry production therefore takes place with the assembly of the arrangement (3 min to 5 min) and passage through the roller arrangement (1 min to 2 min) in a few minutes, in particular in fewer than 10 minutes.

Preferably the membrane electrode unit is laminated at a temperature of approx. 180° C. to 190° C. Thanks to the stable, extruded membrane, lamination takes place at a relatively high temperature of approx. 180° C., such that the lamination process is shorter than at lower temperatures and the laminate joint is more stable.

Polyimide films, e.g. Kapton® or Norton® films, are preferably used as separating films. Alternatively, PTFE films or films composed of other materials which are temperature-resistant at approx. 200° C. to 220° C. are used. The separating films have the function of fixing the substrate electrode unit and the membrane in the desired position and in addition, of preventing the membrane from adhering to the hot laminating roller. Kapton® or Norton® film are dimensionally stable, transparent (additional optical control of the substrate electrode unit or membrane positioning possible) and reusable at the selected processing temperatures. The separating film is preferably approximately 125 μm in thickness.

In accordance with a preferred version, after the production of the pressure connection at least the outer separating films and the frames are removed. The separating films and the optional frames only have a material-protective or supporting function in the production of the membrane electrode unit and are therefore removed at the end, such that the membrane electrode unit is ready, e.g. for use in fuel cells or in an electrolysis process. The removal of the separating films and the frames may take place immediately after lamination or later at the operating site of the membrane electrode unit.

In accordance with another preferred version, after the production of the pressure connection the substrates for the electrode layers are also removed. In the case of membrane electrode units for fuel cells, the substrates composed of carbon paper are retained and form a gas diffusion layer. However, if the membrane electrode units are provided for an electrolysis process, the substrate material can be removed and replaced by an electrochemically more stable gas diffusion layer (e.g. by titanium sintered plates or titanium fabrics) during assembly of the electrolysis cells.

Preferably the separating films present the largest area of the components of the layered arrangement, i.e. they cover the remaining components of the arrangement completely and project beyond them. On the one hand, the separating films therefore ensure the best protection from the heated laminating rollers in particular. On the other hand, in addition continuous "assembly line" production is made easier, in which the quasi endless separating films are separated at an appropriate place in order to obtain the individual membrane electrode units after the pressure connection.

The production of the membrane electrode units is furthermore simplified in that expediently as the separating films are being fed into a roll gap between the laminating rollers, essentially no compressive force acts on the arrangement and a compressive force is only exerted on the arrangement if the substrate electrode units or the optional frames are in the area of the roll gap. During the intake of the separating films of the arrangement, the roll gap is therefore in an "open" condition to accelerate the intake of the arrangement into the roll gap. The laminating rollers are only brought together when the substrate electrode units or the optional frames have reached the roll gap, such that it is ensured that the compressive force of the laminating rollers acts on the whole area of the electrode layers and the membrane. In addition, in particular unheated take-off rollers are provided which draw the arrangement and in particular the separating films into the roll gap between the laminating rollers. The take-off rollers feed the arrangement through the roll gap when the laminating rollers are opened. The take-off rollers are in particular arranged in the direction of flow behind the laminating rollers, such that they grasp one end of the separating films and draw the remainder of the layered arrangement into the roll gap between the laminating rollers.

The object is furthermore achieved according to the invention by a membrane electrode unit produced by means of the method according to one of the preceding embodiments.

In addition, the object is achieved according to the invention by means of a roller arrangement comprising two laminating rollers for the dry production of membrane electrode units according to one of the preceding embodiments.

The advantages and preferred embodiments listed with regard to the method can be correspondingly transferred to the membrane electrode unit and the roller arrangement.

The roller arrangement comprises the laminating rollers and if necessary also the take-off rollers. The laminating rollers can preferably be heated, their temperature being adjustable. The laminating rollers used are expediently made of stainless steel, silicone and/or fluororubber, e.g. Viton®. As the various membranes require different processing, advantageously the contact pressure of the laminating rollers on the layered arrangement and the gap width of the laminating rollers are separately variable or adjustable. The gap width in this connection is taken to mean the minimum possible clearance between the laminating rollers during lamination. In addition, the rotational speed of the laminating rollers, in particular of the take-off rollers as well, is preferably adjustable.

BRIEF DESCRIPTION OF THE SEVERAL VIEWS OF THE DRAWING

An exemplary embodiment of the invention is explained in more detail on the basis of a drawing, in which.

In the different figures the same reference characters have the same meaning.

DESCRIPTION OF THE INVENTION

Figure 1:
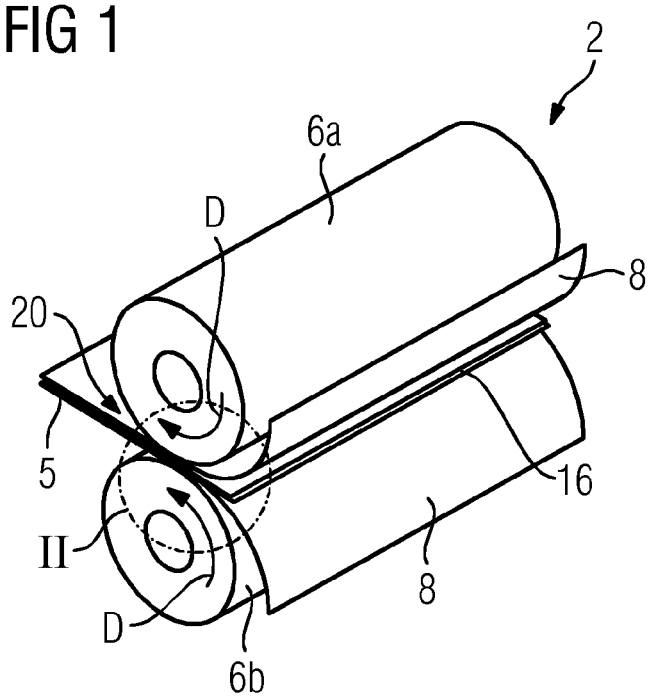
FIG. 1 shows the production of a membrane electrode unit between two laminating rollers.
Figure 2:
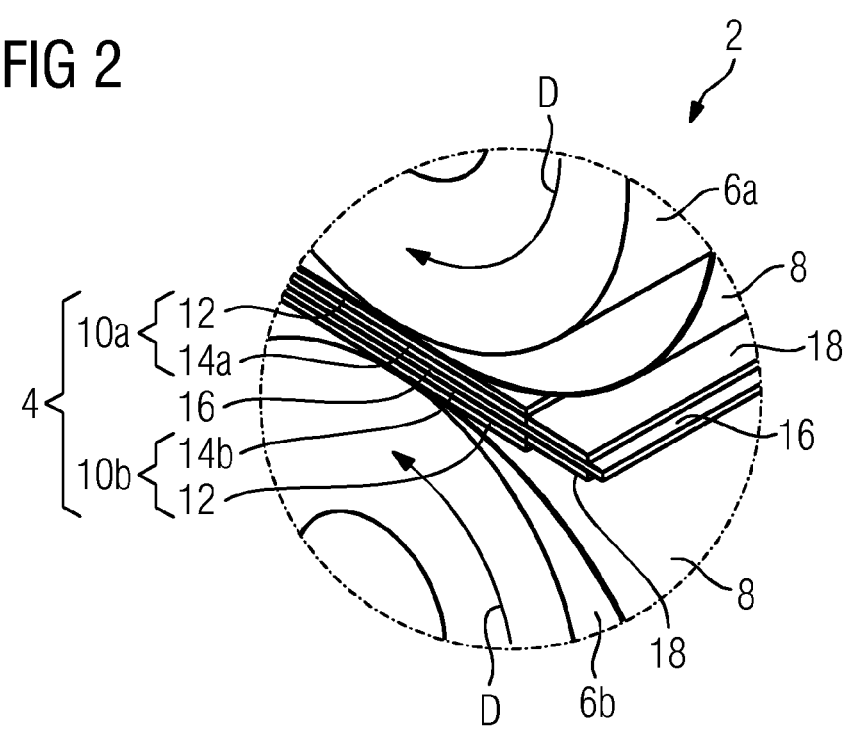
FIG. 2 shows an enlargement of the section II in accordance with FIG. 1.

A roller arrangement 2 is shown by FIG. 1 and FIG. 2 with the aid of which a membrane electrode unit 4 is manufactured. The roller arrangement 2 comprises two laminating rollers 6a, 6b which turn in a direction of rotation D during operation. In the exemplary embodiment shown, the laminating rollers 6a, 6b are made of stainless steel in particular.

For the production of the membrane electrode unit 4 a sandwich-like arrangement 5 is assembled which is pressed together by the laminating rollers 6a, 6b. The layered assembly of the arrangement 5 is shown in FIG. 2. The individual components of the arrangement 5 are arranged one above the other from the outside to the inside on each side:

- two separating films 8 e.g. of Kapton®, which produce the contact with the laminating rollers 6a, 6b,
- two substrate electrode units 10a, 10b, each comprising a substrate 12 e.g. of carbon paper or polyimide film and an electrode layer 14a (anode) applied to this e.g. of iridium, or 14b (cathode), e.g. of platinum,
- a centrally arranged membrane 16, e.g. of Nafion®, which is somewhat longer than the substrate electrode units 10a, 10b (see FIG. 2),
- and two frames 18 of PTFE arranged around substrate electrode units 10a, 10b, e.g. of Teflon®, which fix and seal the substrate electrode units 10a, 10b.

The frames 18 are only optional and may be omitted—their function is then assumed by the separating films 8.

The method for the production of the membrane electrode unit 4 is characterized in that the membrane 16 is kept dry throughout the entire production process, i.e. the membrane 16 is not moistened to produce a connection between it and the electrode layers 14a, 14b. In this connection, the membrane 16 is a Nafion® membrane from DuPont prefabricated by means of extrusion (for example, Nafion® 117 or Nafion® 1110 with a thickness of approx. 180 µm and 250 µm) which is dried at 80° C. to 100° C., in particular at 80° C. to 90° C. for approx. 15 min to 30 min before installation in the membrane electrode unit 4.

At the beginning of the lamination process the laminating rollers 6a, 6b are moved apart in an open position. With the laminating rollers 6a, 6b in this position, the Kapton® film 8, which is longer than the remaining components 10a, 10b, 16, 18 of the arrangement 5, is pushed through a roll gap 20. This procedure can be facilitated by means of two take-off rollers not shown in more detail here, by the take-off rollers further transporting the separating films 8 by means of their rotation, such that the entire arrangement 5 is drawn into the roll gap 20. As the separating films 8 are being fed into the roll gap 20, essentially no compressive force consequently acts on the arrangement 5. The laminating rollers 6a, 6b are only moved toward each other once the substrate electrode units 10a, 10b or the frames 18 are in the roll gap 20 and a compressive force is consequently exerted on the arrangement 5.

During operation the laminating rollers 6a, 6b are heated to soften the membrane 16 and connect it to the electrode layer 14a, 14b under pressure. In addition, a rotational speed, a compressive force of the laminating rollers 6a, 6b and a gap width of the roll gap 20 are adjustable or infinitely variable.

Within the framework of a continuous process in particular several membrane electrode units 4 can be produced by means of the roller arrangement 2, by arranging several electrode-membrane-electrode arrangements consecutively between the separating films 8.

After the lamination process, first the separating films 8 are taken off and then any optional frames 18 are removed. A membrane electrode unit produced in this way can be used in an electrolyzer, a fuel cell or a redox flow battery. When using the membrane electrode unit 4 in an electrolyzer, the substrate 12, e.g. of carbon paper or polyimide film, can also be optionally removed and replaced by another more oxidation-resistant gas diffusion layer, e.g. porous titanium plates.

The main advantage of the aforementioned method for the dry production of membrane electrode units 4 compared with the method hitherto customary by means of a hot press is the significantly reduced production time because it is not necessary to keep the membrane 16 moist at high temperatures of approx. 150° C. to 200° C. under pressure. Neither the time nor the energy required to heat or cool the press between the individual pressing processes is necessary. In this connection, a prefabricated, mechanically stable and physically resistant membrane 16 produced by means of extrusion is used which is pre-dried before installation in the membrane electrode unit (4). Pre-drying of the membrane 16, which is aqueous when delivered, prevents the release of water from the membrane during hot rolling. The method is characterized by high rolling temperatures which enable a sufficient binding of the catalyst layer (14a, 14b) to the membrane 16 and by simple, optical positioning of the electrodes 10a, 10b in front of the roller feeder.

The invention claimed is:

1. A method for the dry production of a membrane electrode unit for an electrolysis process, the method comprising the following steps:
    drying an extruded membrane having upper and lower surfaces at a temperature between 80° C. and 100° C. for a period of time from 15 min to 30 min;
    assembling a layered configuration comprising:
        a centrally positioned, dried, extruded membrane;
        two substrate electrode units each disposed on a respective surface of the membrane and each having a substrate and an electrode layer applied to the substrate; and
        two separating films, each disposed on an outer surface of a respective one of the substrate electrode units; and
    pressing the layered configuration together between two oppositely positioned laminating rollers to produce a pressure connection at least between the membrane and the electrode layers.

2. The method according to claim 1, which further comprises placing a respective frame around each substrate electrode unit for fixing the substrate electrode unit.

3. The method according to claim 2, which further comprises removing at least the outer separating films and the frames, after the step of producing the pressure connection.

4. The method according to claim 2, which further comprises:
    exerting substantially no compressive force on the configuration as the separating films are fed into a roll gap between the laminating rollers; and exerting a compressive force on the configuration when the substrate electrode unit and the frames are in vicinity of the roll gap.

5. The method according to claim 1, which further comprises laminating the membrane electrode unit at a temperature of approximately 180° C. to 190° C.

6. The method according to claim 1, which further comprises selecting polyimide films as the separating films.

7. The method according to claim 1, which further comprises removing the substrates for the electrode layers, after the step of producing the pressure connection.

8. The method according to claim 1, wherein the separating films have a larger area than the membrane and the substrate electrode units.

9. The method according to claim 1, which further comprises:
- exerting substantially no compressive force on the configuration as the separating films are fed into a roll gap between the laminating rollers; and
- exerting a compressive force on the configuration when the substrate electrode unit is in vicinity of the roll gap.

* * * * *